(12) United States Patent
Schwöller

(10) Patent No.: US 10,875,654 B2
(45) Date of Patent: Dec. 29, 2020

(54) DRIVE DEVICE FOR AN AIRCRAFT

(71) Applicant: ScaleWings IP GmbH, Strasswalchen (AT)

(72) Inventor: Johann Schwöller, Strasswalchen (AT)

(73) Assignee: Scalewings IP GmbH, Strasswalchen (AT)

( * ) Notice: Subject to any disclaimer, the term of this patent is extended or adjusted under 35 U.S.C. 154(b) by 339 days.

(21) Appl. No.: 15/745,447

(22) PCT Filed: Jul. 18, 2016

(86) PCT No.: PCT/EP2016/067080
§ 371 (c)(1),
(2) Date: Jun. 22, 2018

(87) PCT Pub. No.: WO2017/013077
PCT Pub. Date: Jan. 26, 2017

(65) Prior Publication Data
US 2019/0084683 A1 Mar. 21, 2019

(30) Foreign Application Priority Data

Jul. 17, 2015 (DE) .................. 10 2015 111 666

(51) Int. Cl.
*B64D 27/14* (2006.01)
*B64D 33/04* (2006.01)
(Continued)

(52) U.S. Cl.
CPC ............ *B64D 27/14* (2013.01); *B64C 11/001* (2013.01); *B64D 33/02* (2013.01); *B64D 33/04* (2013.01);
(Continued)

(58) Field of Classification Search
CPC .......... B64C 11/001; B64D 2033/0293; B64D 27/14; B64D 33/02; B64D 33/04;
(Continued)

(56) References Cited

U.S. PATENT DOCUMENTS 2,478,206 A   8/1949 Redding
3,054,577 A   9/1962 Wolf et al.
(Continued)

FOREIGN PATENT DOCUMENTS

DE   3245543 A1   6/1984
DE   4237182 A1   9/1993
(Continued)

OTHER PUBLICATIONS

International Search Report of the International Searching Authority, dated Nov. 2, 2016, from International Application No. PCT/EP2016/067080, filed on Jul. 18, 2016. 3 pages.
(Continued)

*Primary Examiner* — Phuttiwat Wongwian
*Assistant Examiner* — Diem T Tran
(74) *Attorney, Agent, or Firm* — HoustonHogle LLP

(57) ABSTRACT

According to the invention, a drive device for an aircraft is provided, which has a shaft turbine coupled to an impeller via a shaft. The impeller has an intake side and a thrust side. The shaft turbine is mounted in the area of the intake side of the impeller. The drive device is also designed for mounting externally on an aircraft fuselage and/or inside an aircraft fuselage and/or in a casing on a wing.

22 Claims, 7 Drawing Sheets

(51) Int. Cl.
  *F02K 3/062* (2006.01)
  *B64D 33/02* (2006.01)
  *B64C 11/00* (2006.01)
  *B64D 35/00* (2006.01)
  *B64D 35/02* (2006.01)

(52) U.S. Cl.
  CPC ............. *B64D 35/00* (2013.01); *B64D 35/02* (2013.01); *F02K 3/062* (2013.01); *B64D 2033/0293* (2013.01); *F05D 2250/52* (2013.01); *Y02T 50/60* (2013.01)

(58) Field of Classification Search
  CPC ......... B64D 35/00; B64D 35/02; F02K 3/062; F05D 2250/52; Y02T 50/672
  See application file for complete search history.

(56) References Cited

U.S. PATENT DOCUMENTS

| | | | |
|---|---|---|---|
| 3,289,975 A | | 12/1966 | Hall |
| 4,088,285 A | | 5/1978 | Sogabe et al. |
| 4,183,210 A | | 1/1980 | Snell |
| 4,307,857 A | | 12/1981 | Godbersen |
| 4,871,130 A | | 10/1989 | Schulze |
| 5,809,772 A | * | 9/1998 | Giffin ...................... F02K 3/075 60/226.1 |
| 8,549,833 B2 | * | 10/2013 | Hyde ........................ F02C 6/18 60/204 |
| 2010/0212285 A1 | | 8/2010 | Negulescu |
| 2011/0173812 A1 | * | 7/2011 | Karvinen .............. F04D 29/281 29/889.4 |
| 2014/0252161 A1 | | 9/2014 | Gukeisen |

FOREIGN PATENT DOCUMENTS

| | | |
|---|---|---|
| DE | 10303189 A1 | 7/2004 |
| EP | 2223856 A2 | 9/2010 |
| GB | 1557817 | 12/1979 |

OTHER PUBLICATIONS

Written Opinion of the International Searching Authority, dated Nov. 2, 2016, from International Application No. PCT/EP2016/067080, filed on Jul. 18, 2016. 6 pages.
U.S. Appl. No. 15/745,447, filed Jun. 22, 2018.

* cited by examiner

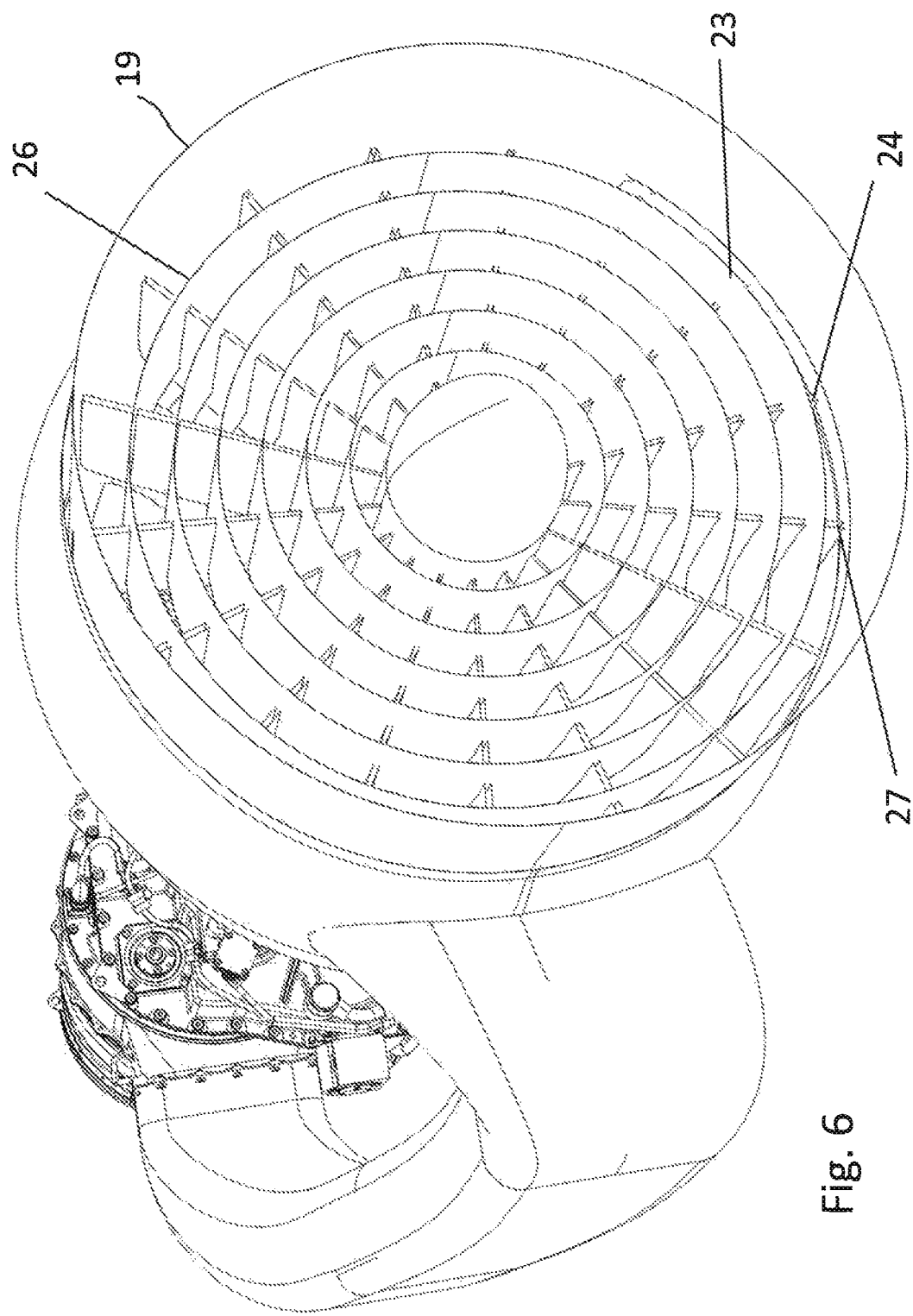

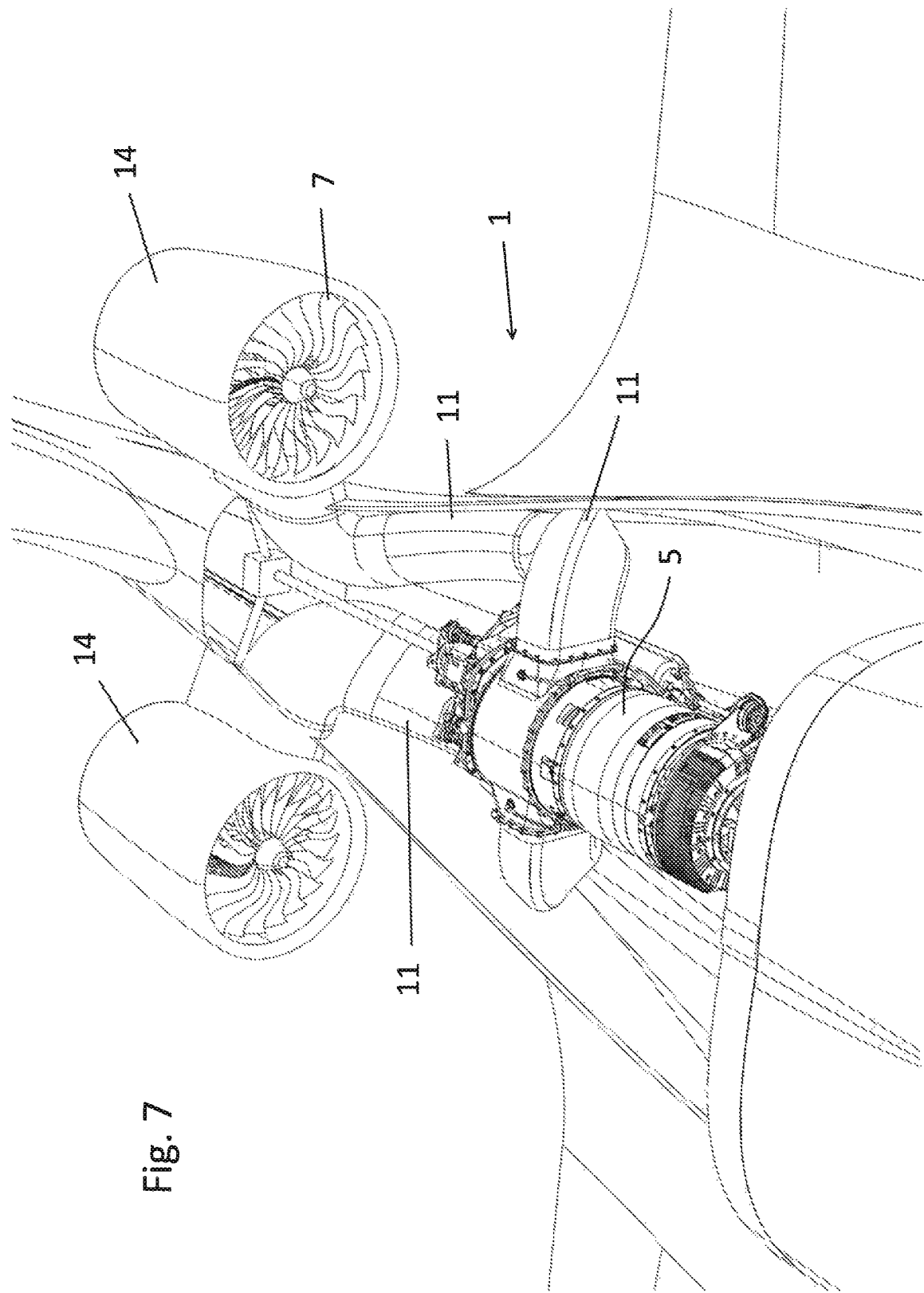

DRIVE DEVICE FOR AN AIRCRAFT

RELATED APPLICATIONS

This application is a § 371 National Phase Application of International Application No. PCT/EP2016/067080, filed on Jul. 18, 2016, which claims priority to German Application No. 10 2015 111 666.9, filed on Jul. 17, 2015, both of which are incorporated herein by reference in their entirety.

BACKGROUND OF THE INVENTION

The present invention relates to a drive device for an aircraft and also to an aircraft with such a drive device.

Aircraft may have a propeller turbine jet engine (PTJ). Such propeller turbine jet engines are also known as turboprop engines. A turboprop engine is a thermal power engine with continuous internal combustion and is used mainly as an aircraft engine. Such engines are characterized by relative low fuel consumption.

A turboprop engine comprises a gas turbine, which is in the form of a turboshaft engine and drives a propeller through a gearbox. The thrust is here generated almost exclusively by the propeller, to which the energy of the turbine is transmitted. Around 90% of the overall thrust stems from the propeller and only around 10% or even less than 3% from the residual thrust of operating gas issuing from an outlet diffuser. During thrust generation, in comparison with the amount of operating gas flowing through the engine, very large air volumes are moved by the propeller as drive medium and at the same time weakly accelerated, while in the case of pure jet engines, small volumes of the drive medium are strongly accelerated.

The energy to drive the propeller is supplied by the gas turbine. The gas turbine sucks in air, which is compressed in an axial or radial, generally multi-stage, turbocompressor. It then passes into a combustion chamber, where it burns the fuel. The now hot energy-rich combustion gas flows through the generally axial and multi-stage turbine, wherein it expands and cools down. The energy transmitted to the turbine drives the compressor via a shaft and the propeller or airscrew via a gearbox (propeller gearbox). The exhaust gases are at the same time ejected in the direction of flight. Generally, such turboprop engines are in the form of two-shaft engines i.e. a first shaft connects the compressor to one or more wheels in the exhaust jet, by which it is driven. A second shaft takes up via turbine wheels almost the entire remaining energy, which it transmits via a gearbox to the propeller.

Disclosed in U.S. Pat. No. 4,088,285 A is a glider with an auxiliary drive. This auxiliary drive is integrated in a rear section of the fuselage and comprises an internal-combustion or piston engine which drives an impeller via a shaft and is located in the area of an intake side of the impeller.

DE 10303189 A1 discloses a drive for a remote-controlled model aircraft. This drive includes an impeller which is driven by an internal-combustion engine, wherein the internal-combustion engine is also located in the area of an intake side of the impeller.

Disclosed in U.S. Pat. No. 4,307,857 A is a ducted propeller. The ducted propeller is driven by an engine and is provided in particular for a model aircraft.

DE 3245543 A1 discloses a multi-stage impeller drive. This impeller drive is provided for true-to-scale model aircraft and is intended to be driven by an internal-combustion engine.

Disclosed in U.S. Pat. No. 3,289,975 A is an aircraft. This aircraft includes four jet engines, each comprising an engine, a ducted propeller and a nozzle. In particular it is provided here that a setting angle of a thrust tube located on a thrust side of the nozzle may be varied.

Known from DE 4327182 A1 is an aircraft with pressure screw drive. Provided here is an engine integrated in an aircraft fuselage and which, via a shaft, drives an airscrew which is accommodated at the fuselage end between the tail units.

Disclosed in US 2014/0252161 is a drive device for an aircraft. This comprises a thrust jet or turbofan engine, the thrust of which is used to propel the aircraft, and wherein the turbofan also drives a rotor via a gearbox and a shaft. The turbofan includes a compressor section which is provided to supply air to a combustion system. The combustion system generates high-velocity exhaust gases, which drive a turbine section. The rotor is here mounted transversely to the direction of flight next to the turbofan, or in the direction of flight to the side of the turbofan and in particular in the area of an intake side of the turbofan.

As compared with a conventional drive using piston engines, turboprop engines have the advantage of lower weight for the same performance, a smaller front surface, and a higher maximum output per engine. For fuel, the usual aviation jet fuel (kerosene jet A-1 or similar) is used.

Gas turbines may be in the form of shaft turbines, in which the turbine drives a drive shaft. A portion of the mechanical energy generated is required by the gas turbine itself to drive the compressor and other units such as fuel pumps, etc. The remaining portion is used as useful energy, for example to drive the main and rear engines of helicopters, for propellers of turboprop aircraft or for other mechanically driven equipment, such as for example generators, compressors or pumps. In the case of aircraft engines, the emitted gas jet generates some additional thrust.

In the aircraft type "Starship Beechcraft", e.g. two PT 6A-66 engines of the company Pratt & Whitney are provided. These are designed as pusher propellers and attached to the wings of the aircraft in an unconventional manner. Here it is provided that a shaft turbine mounted on the wing drives a free-lying (i.e. outside the wing or a housing) propeller which is mounted behind the shaft turbine in the direction of flight. The exhaust gases are here discharged in the direction of the propeller, against the direction of flight. These hot exhaust gases at the same time involve a not inconsiderable load for the propeller.

Aircraft with turboprop drive may be launched on normal sports airfields, i.e. on airfields without turbojet authorization. Aircraft with jet engines on the other hand require airfields with special authorization. Aircraft with at least one jet engine are described as "Complex Aircraft". Their authorization and operation are extremely complex and expensive. Aircraft with a maximum of one turboprop engine do not count as "Complex Aircraft" and are therefore much more easily authorized. They are even permissible under the simplified ultra-light (up to 475.2 kg) and CS-LAS authorization (up to 600 kg take-off weight) schemes.

SUMMARY OF THE INVENTION

The problem of the present invention is to provide a drive device for an aircraft and an aircraft with such a drive device which will operate efficiently, reduce noise emissions, may be integrated in a fuselage or a wing of an aircraft, and allows wide use in aviation.

The problem described above is solved by a drive device for an aircraft according to claim 1, and by an aircraft with such a drive device according to claim 9. Advantageous developments are set out in the dependent claims.

According to the invention, a drive device for an aircraft is provided, which has a shaft turbine coupled to at least one impeller via a shaft. The impeller has an intake side and a thrust side. The shaft turbine is mounted in the area of the intake side of the impeller. The drive device is also designed for mounting externally on an aircraft fuselage and/or inside an aircraft fuselage and/or in a casing in or on a wing.

The drive device may be characterized in that in particular almost the entire energy or almost the entire discharged power of the turbine is fed to the impeller via the shaft.

Backflow of an exhaust gas flow of the turbine is then not used directly for thrust generation.

This means that the shaft turbine or the turboshaft engine, also the impeller of the drive device, are mounted in an enclosed housing or inside an aircraft fuselage and/or inside a wing or in a casing on a wing. The drive device may therefore be integrated completely in an aircraft, for example in an aircraft fuselage.

In the case of the drive device, the shaft turbine lies in the area of the intake side of the impeller or in a direction of flight upstream of the impeller, meaning that such a drive device or such an engine may be classified as a turboprop drive with separate rotor, since the impeller (shrouded airscrew, shrouded propeller) is regarded as a rotor. In this way a drive device is provided which is not rated as a "Complex Aircraft". Operation is thus possible at airfields which have no authorization for turbojet drives. These are for example normal sports airfields.

According to the present invention, two separate drive units, the shaft turbine and the separate rotor, namely the impeller, are provided. These are regarded for authorization as two clearly separated components, connected to one another only via the shaft.

The rotor may be connected directly to the shaft turbine via a shaft.

According to an advantageous embodiment, however, it may be provided that the rotor is connected to the shaft turbine via a gear stage. A clutch may also be provided between the shaft of the shaft turbine and the rotor of the impeller. An elastic or Cardan coupling may also be provided for shaft angle compensation and/or for vibration decoupling.

Due to the fact that the shaft turbine is mounted in the area of the intake side of the impeller, and the drive device including the shaft turbine and the impeller are mounted in a sealed housing, the efficiency of the whole drive train is enhanced as compared with one or more jet engines. This is due to the fact that the exit velocity of the airflow from the impeller of the drive device according to the invention is around 15% to 20% higher than the flying speed and a relatively high volume flow is emitted as thrust. Because of this, the drive device is operated at the optimal operating point and achieves a high rate of efficiency, in particular at flying speeds of around 350 km/h to around 700 km/h.

In addition, specific fuel consumption is for example only around a third, as compared with a pure jet engine with similar thrust power integrated in a fuselage.

This is due to the fact that, in the case of a jet engine, the outflowing gases are accelerated to a speed which is a multiple of flying speed, resulting in very low efficiency at low flying speeds.

In the drive device according to the invention, the majority or almost all of the energy or drive energy of the turbine is fed to the impeller via the shaft. The impeller accelerates a significantly greater air mass to a speed lying only just above the maximum flying speed. This results in a much greater overall efficiency of the drive at low speeds.

A turboshaft engine has the following advantages over piston engines:
  fewer moving parts, leading to greater reliability
  reduced overall size for the same performance
  much lower weight, e.g. a PBS TS100 turboshaft engine with 250 hp weighs only around 60 kg, while a comparable piston engine with this power weighs around 150 to 180 kg
  vibration-free running
  lower noise emissions, both inside and outside
  extended servicing intervals
  longer running time, greater time between overhaul (TBO)
  greater flight altitudes possible than with a piston engine without turbocharger
  greater continuous output (>95% of maximum output).

In addition the drive device may be encased for noise reduction by very simple means, thereby leading to lower noise emissions. In addition is the fact that the thrust jet is extremely quiet since it is blown out at only one third of the thrust jet velocity of a pure jet engine.

An aircraft is preferably a manned aircraft. Furthermore, within the scope of the present invention, the aircraft fuselage may be regarded as the housing of the drive device. In order to make the drive device an integral assembly, it may also however have a separate housing, which surrounds the impeller and the shaft turbine. This assembly may be inserted in the aircraft fuselage.

Alternatively, such an assembly may also be mounted outside the fuselage, e.g. as a nacelle on the fuselage or the wings.

In the area of the thrust side, adjoining the impeller, a thrust tube with narrowed exhaust cross-section may be provided. By narrowing the exhaust cross-section at the thrust tube end (exhaust nozzle), the thrust of the drive device may be increased.

In addition, at least one exhaust duct or exhaust duct system may be provided, via which the exhaust gases of the turbine are so guided away that the exhaust gases are for the most part led into the area of an intake side of the impeller. By this means, however, the impeller is subjected to heat loading. Another result is that the thrust of the impeller falls, since the air volume to be accelerated is hotter and therefore, with the same cross-section and the same flow rate, a smaller air mass is accelerated.

According to a more advantageous variant, the exhaust duct may therefore be so designed that the exhaust gases of the shaft turbine are guided around the impeller, preferably in the area of the thrust side of the impeller.

Due to the fact that the exhaust gases of the shaft turbine are guided into the area of the thrust side of the impeller, in particular into the thrust tube, they heat up the air in the thrust tube. Since the air in the thrust tube is heated up, it increases in volume. The increase in volume of the thrust jet raises the thrust of the entire drive device, since the heated air with greater volume is once more accelerated for exit from the thrust tube through the exhaust nozzle. This principle is similar to that of an afterburner in a thrust tube.

The exhaust duct system may for example have two channels.

The drive device according to the invention may also be characterized in particular in that the exhaust gases of the shaft turbine are guided into the area of the thrust side of the impeller, in particular into the thrust tube. In this way, a thrust gain is obtained from the heat energy of the exhaust gas flow of the shaft turbine. In contrast to this, it is provided for example in US 2014 252161 A1, to use an exhaust gas flow of a thrust jet engine directly for thrust gain. For an aircraft with such a drive, however, a "Complex Aircraft" authorization is necessary.

According to the invention, only the energy contained in the hot exhaust gas flow is used.

To use this energy more efficiently, the drive device may have a heat exchanger provided in the area of the thrust tube. The heat energy contained in the exhaust gas flow may be introduced via the heat exchanger into the thrust tube and thus into the thrust jet. By this means the heat energy is transmitted to the cold impeller thrust jet which then expands in volume. Narrowing of the flow control of the hot exhaust gas flow in the thrust tube prevents a reduction in the volume of the hot exhaust gases through cooling from offsetting the increase in volume of the cold impeller flow. This results in an increase in the volume flow of the thrust jet and consequently a thrust gain.

The heat exchanger may include heat transfer fins extending in the direction of flight or in the axial direction of the aircraft fuselage and extending into the exhaust duct system and the thrust tube. An area of the heat transfer fins which extends into the exhaust duct system is heated up by the hot exhaust gases flowing in the exhaust duct system. This heat energy is then transferred, via an area of the heat transfer fins which extends into the thrust tube, to the cold impeller thrust jet which is flowing past.

The cross-section of the exhaust ducts narrows against the direction of flight in proportion to the cooling down of the exhaust gases. A jacket wall of the thrust tube narrows accordingly to the same extent, so that the cross-section of the thrust tube in which the thrust jet is guided is roughly constant. The volume increase during heating up effects an acceleration of the thrust jet and therefore a thrust gain.

Due to the elongated design of the heat exchanger and the heat transfer fins, which extend to a rear end of the thrust tube or even beyond it, the back pressure prevailing in the thrust tube is unable to affect the exhaust gas flow (i.e. the exhaust gases of the shaft turbine need not be ejected against the higher pressure in the thrust tube).

The exhaust duct system may comprise for example two channels which have a roughly circular cross-section and taper conically against the direction of flight.

In addition, a stator device may be located in the area against the direction of flight behind the impeller and in the area of the thrust tube. The stator device includes a fixed guide vane ring which deflects the airflow from a swirl into the axis of the direction of flight. In this way, more thrust is generated, since the thrust jet downstream of the stator device is substantially swirl-free. This is obtained by the fact that guide vanes of the guide vane ring in the thrust side pass from oblique to the direction of flight to being in line with it. Consequently the cross-section of the thrust jet is also enlarged and thrust is increased.

The heat exchanger may be integrated in the stator device. In this case the heat energy from the exhaust gas flow is introduced via the stator device into the thrust jet, leading to the increase in thrust described above.

The guide vanes of the stator device are in the form of hollow moldings. The exhaust gas flow of the turbine is brought into the guide vanes over a jacket wall of the stator device. The exit of the cooled exhaust gas flow is effected via slits made in the end sections of the guide Vanes.

In this way, the flow retardation of the stator device is offset by the heating-up of the thrust jet (i.e. due to the enlargement of the flow cross-section in the stator device through the alignment of the thrust jet in the axial direction, it is possible to compensate for the expansion of the air, owing to heat, in this area). This increases efficiency and counteracts any stalling at the guide vanes.

The guide vanes may also be equipped with heat transfer plates, as in the case of a cooler. By this means, more heat energy may be transferred to the impeller airflow. The guide vanes may also be made considerably longer in the direction of an aircraft rear, in order to provide a greater heat transfer surface.

Owing to the use of a high mass flow, with only a fraction of the flow velocity of a jet engine, the drive device is extremely quiet in operation. The impeller has a rotor and a housing. The impeller may be made of stainless steel or aluminum or another suitable material. Preferably the impeller is made of a carbon-fiber composite. For this purpose, any other suitable fiber material, such as e.g. a glass-fiber or aramid-fiber composite material or the like may also be used.

Therefore, according to the invention, the heat energy in the exhaust gas flow of the shaft turbine may be used to increase thrust, by introduction into the cold thrust jet of the impeller either directly or via the heat exchanger.

According to the invention, an aircraft is provided which includes a fuselage and wings, together with a drive device according to the invention.

The aircraft may have an impeller air supply device designed in such a way that air from outside the aircraft is guided into the area between the shaft turbine and the intake side of the impeller.

In this way the airflow required to generate thrust is fed efficiently to the impeller.

A turbine air supply device may also be provided, which is separate from the impeller air supply device and guides air from outside the aircraft to an intake side of the turbine. With this, the turbine does not have to suck in against the partial vacuum prevailing in an intake passage of the impeller or the impeller air supply device.

Due to the fact that both the impeller air supply device and the turbine air supply device are separate from one another, it is possible to dimension and design intake ports and flow channels of the two air supply devices in such a way that the impeller and the turbine are provided with exactly the required volume flows needed for operation.

Alternatively, the turbine may be supplied with the air needed for operation from the thrust tube via a flap. By this means, the turbine is subjected to overpressure in the intake area, thereby increasing the power of the turbine.

That means the air required by the turbine for combustion may be branched off downstream of the impeller, redirected, and guided forwards in the direction of flight, with feed to the turbine on an intake side. By this means the turbine is able to generate more power, since compressed air from the thrust jet of the impeller is sucked in.

According to an advantageous development, a control unit is provided, or the flap may be controlled separately by means of a suitable turbine control in such a way that the turbine may be provided with the optimal amount of air via the air supply device, according to operating status.

In addition, a channel may also be provided which is so designed that air is taken from the thrust tube, i.e. from the thrust jet by means of a flap, and is then fed as combustion air via the channel of the turbine.

Moreover, a drive device may be provided in the fuselage in an area behind a cockpit and/or at least one drive device in the wings or in a housing on the wings.

This means that the shaft turbine 5 is positioned on the intake side 12, approximately axially flush with the impeller 7.

If e.g. two impellers are provided, which are driven by one turbine, they may also be arranged axially offset to the turbine and behind the turbine in the direction of flight.

The inventor of the present invention has recognized that a drive device for an aircraft or an aircraft with such a drive device, in which a shaft turbine is provided, which is connected via a shaft to an impeller which has an intake side and a thrust side, wherein the shaft turbine is mounted in the area of the intake side of the impeller, and the drive device and the shaft turbine and the impeller are mounted in a housing, is extremely advantageous.

These advantages lie in the enhanced efficiency, the lower specific fuel consumption, the noise-suppressing shrouding in the mounting in a housing, and in the fact that an alternative drive to a known jet engine is provided. Aircraft equipped with a drive device according to the invention need no special authorization since, with provision of a drive device according to the invention, they are much more easily approved and do not require airfields with turbine permission. They may even be granted the simplified ultra-light (up to 472.5 kg) and CS-LSA (up to 600 kg) approval. An aircraft provided with such a drive device may therefore start and land at any sports airfield as desired. This increases considerably the scope for use of such aircraft.

BRIEF DESCRIPTION OF THE DRAWINGS

The invention is described in detail below with the aid of the Figures, which show in.

DETAILED DESCRIPTION OF THE PREFERRED EMBODIMENTS

Figure 1:
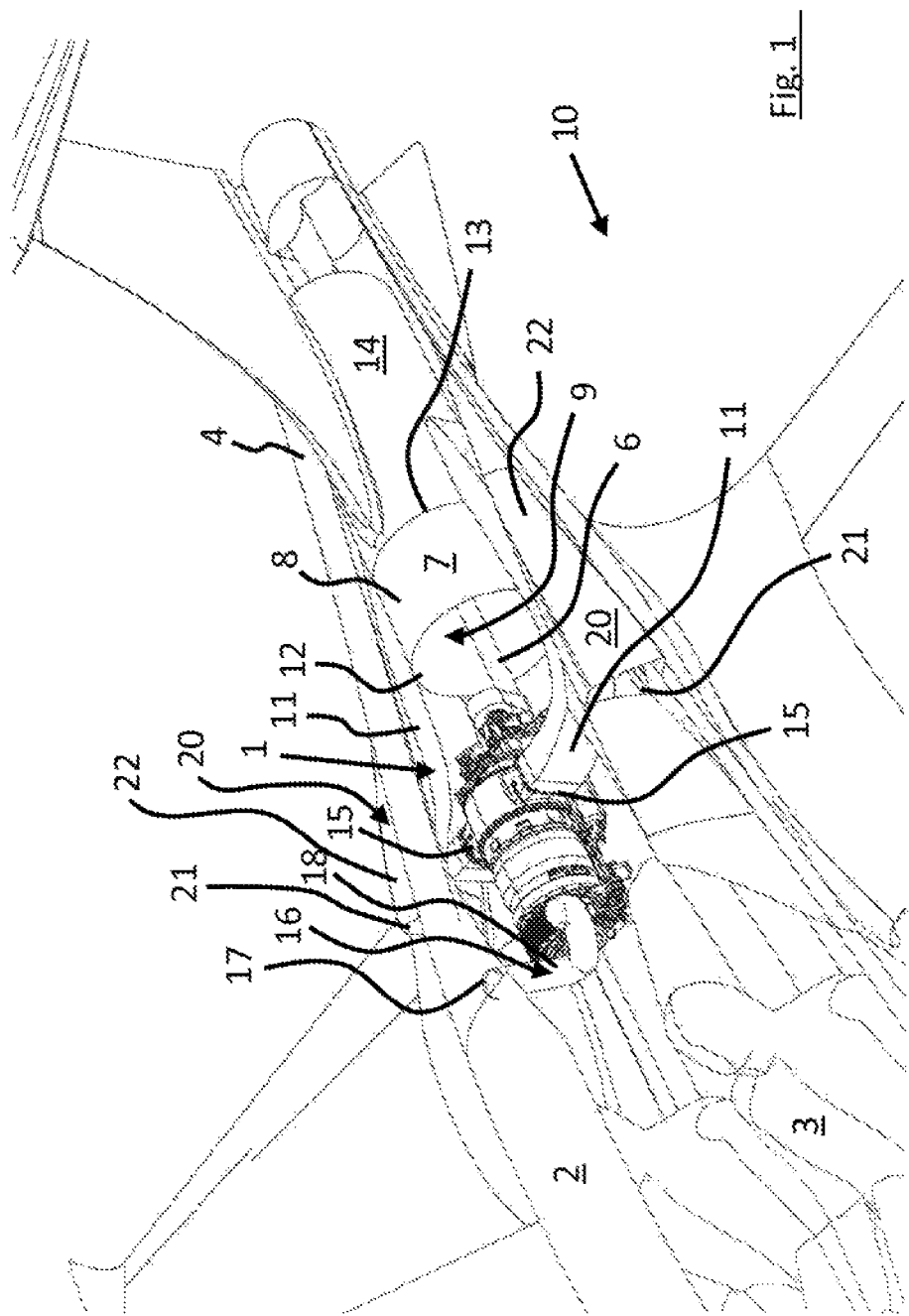
FIG. 1 a schematic perspective partial view of an aircraft with a drive device according to the invention, in which the drive device is in the form of a turbine FIG. 2 a schematic perspective partial view of the drive device according to the invention with a heat exchanger according to a first embodiment FIG. 3 a further schematic perspective partial view of the drive device according to the invention with a heat exchanger according to the first embodiment FIG. 4 a schematic perspective partial view of the drive device according to the invention with a heat exchanger according to a second embodiment with one impeller FIG. 5 the schematic perspective partial view of FIG. 4 in a detail view FIG. 6 the schematic perspective partial view of FIG. 4 in a further detail view FIG. 7 a schematic perspective partial view of the drive device according to the invention with a heat exchanger according to a second embodiment with two impellers

A drive device 1 for an aircraft 2 (FIG. 1) according to the invention is described below.

The drive device 1 is described by way of example with the aid of a sport aircraft 2.

The drive device 1 is mounted in the aircraft 2 in the area behind the seats or behind the cockpit 3 in the aircraft fuselage 4.

This drive device 1 comprises a shaft turbine 5 which is connected by a turbine 6 to an impeller 7.

The design of the drive device 1 and in particular its arrangement in an aircraft 2 is also explained below with the aid of a direction of flight 10, wherein the direction of flight 10 extends from an aircraft rear towards the nose of the aircraft.

The impeller 7 has a housing 8 and a rotor 9 (airscrew, impeller-rotor, propeller). An inlet side of the impeller is described as the intake side 12. An outlet side of the impeller is described as the thrust side 13.

The turbine 5 uses as fuel common aviation fuels such as e.g. kerosene.

In the direction of flight 10 in the area behind the cockpit, the shaft turbine 5 is mounted in the aircraft fuselage 4.

The rotor 9 of the impeller 7 is mounted in the direction of flight behind the shaft turbine 5 within the aircraft fuselage 4. This means that the shaft turbine 5 is positioned on the intake side 12, approximately flush axially with the impeller 7.

The shaft turbine 5 is connected to the rotor 9 of the impeller 7 via the drive shaft 6.

Provided in the area and following, against the direction of flight 10, is a thrust tube 14 on the thrust side 13 of the impeller 7 extending towards the aircraft rear or against the direction of flight 10.

The shaft turbine 5 has two exhaust outlets 15 extending horizontally transversely to the direction of flight 10.

The exhaust outlets 15 lead into two exhaust ducts 11, in the form of channels. The exhaust ducts 11 direct the exhaust gases of the shaft turbine 5 past the impeller 7 into a thrust-side area 13 of the thrust tube 14. In this way, the exhaust gases of the shaft turbine heat the air emitted by the impeller 7 on the thrust side in the thrust tube 14 and in addition increase the thrust of the overall drive device 1.

The air needed for combustion in the shaft turbine 5 is supplied via a turbine air supply device 16.

The turbine air supply device 16 has a suction intake 17 (shown only schematically) lying outside the aircraft fuselage 4 and leading into a turbine air supply channel 18, wherein the turbine air supply channel is connected to an intake side of the shaft turbine 5 lying upstream in the direction of flight 10.

Also provided is an impeller air supply device 20.

The impeller air supply device 20 has at least one suction intake 21 located outside the aircraft fuselage 4. The suction intake 21 leads into an impeller air supply channel 22 which extends roughly along a center line of the aircraft fuselage against the direction of flight as far as the intake side 12 of the impeller 7.

Via the impeller air supply device 20, the impeller 7 is supplied with the necessary volume flow to generate thrust.

Both the turbine air supply device 16 and also the impeller air supply device 20 may have suitable chokes or flaps which are connected to a drive device or engine control unit and may be controlled in such a way that the air volume flows required for operation may be made available to the shaft turbine 5 and the impeller 7.

According to an alternative embodiment, it is also possible to provide a single air supply device, similar in design to the impeller air supply device 20 described above, but with only one flap leading into a further air supply channel, wherein the piston engine is supplied via this air supply channel with the air needed for combustion.

It is also possible to provide a channel which is so designed that air is withdrawn from the thrust tube, i.e. from the thrust jet, by means of a flap, and is then made available via the channel to the turbine as combustion air.

According to alternative, however not preferred, embodiments it may for example be provided that the exhaust duct system is so designed that a major part of the exhaust gases are fed to the turbine in the area of the intake side 12 of the impeller 7.

Alternatively, the exhaust gases may also be directed via the exhaust duct system to the outside of the aircraft or into the open air.

According to a further embodiment, not illustrated, at least two drive devices may be mounted on the wings of an aircraft.

Accordingly, one, two or more such drive devices may be mounted outside the fuselage. The turbine is located, in the direction of flight, ahead of the two or more impellers in the fuselage.

One, two or more impellers are mounted on the side of the fuselage and are driven by the shaft turbine through a mechanical link. The exhaust gases of the turbine are introduced via a mounting connection of the impeller, either directly or via a heat exchanger.

Here it is advantageous that the high volume flow of the impeller need not be directed into the fuselage via large air inlets. Because the turbine, in the direction of flight, is mounted ahead of the impeller or at the side next to the impeller, the exhaust gases may be directed into the thrust tube of the impeller.

According to such an embodiment, the drive device 1 has a housing encompassing both the shaft turbine 5 and the impeller 7.

An aircraft provided with two drive devices according to the invention then has an extremely efficient drive device and two extremely efficient engines, which suggest the appearance of a jet engine, but are accompanied by the advantages described above, apart from authorization and the associated wider scope of use.

Preferred embodiments of the drive device according to the invention are explained below.

Located in the area against the direction of flight 10 behind the impeller 7 and in the area of the thrust tube 14 is a stator device 19. The stator device includes a fixed guide vane ring 23, which deflects the airflow axially in the direction of flight 10. In this way, more thrust is generated, since the thrust jet downstream of the stator device 19 is substantially swirl-free. This is obtained by the fact that guide vanes 24 of the guide vane ring 23 on the thrust side 13 change from being at an angle to the direction of flight 10 to being axial to the direction of flight 10. Consequently, the cross-section also expands, the thrust jet expands and the thrust is increased.

The exhaust duct system comprises two channel-like exhaust ducts 11. These have a roughly circular and flow-optimized cross-section, tapering conically in the axial direction towards the tail of the aircraft.

The exhaust ducts 11 lead into the thrust tube in such a way that the exhaust gases of the shaft turbine 5 are guided into the area of the thrust side of the impeller. In this way a thrust gain is obtained from the heat energy of the exhaust gas flow of the shaft turbine 5.

The drive device 1 has a heat exchanger device 25 in the area of the thrust tube 14. Due to the fact that the heat energy contained in the exhaust gas flow is introduced via the heat exchanger device 25 into the thrust tube 14 and therefore into the thrust jet, the heat energy is transferred to the cold thrust jet, which then expands or expands in volume. The narrowing of the flow control of the hot exhaust gas flow in the thrust tube 14 prevents a volume reduction of the hot exhaust gas by cooling from being offset by the increased volume of the cold impeller flow. This results in an increase in volume flow of the thrust jet and thus a thrust gain.

Figure 2:
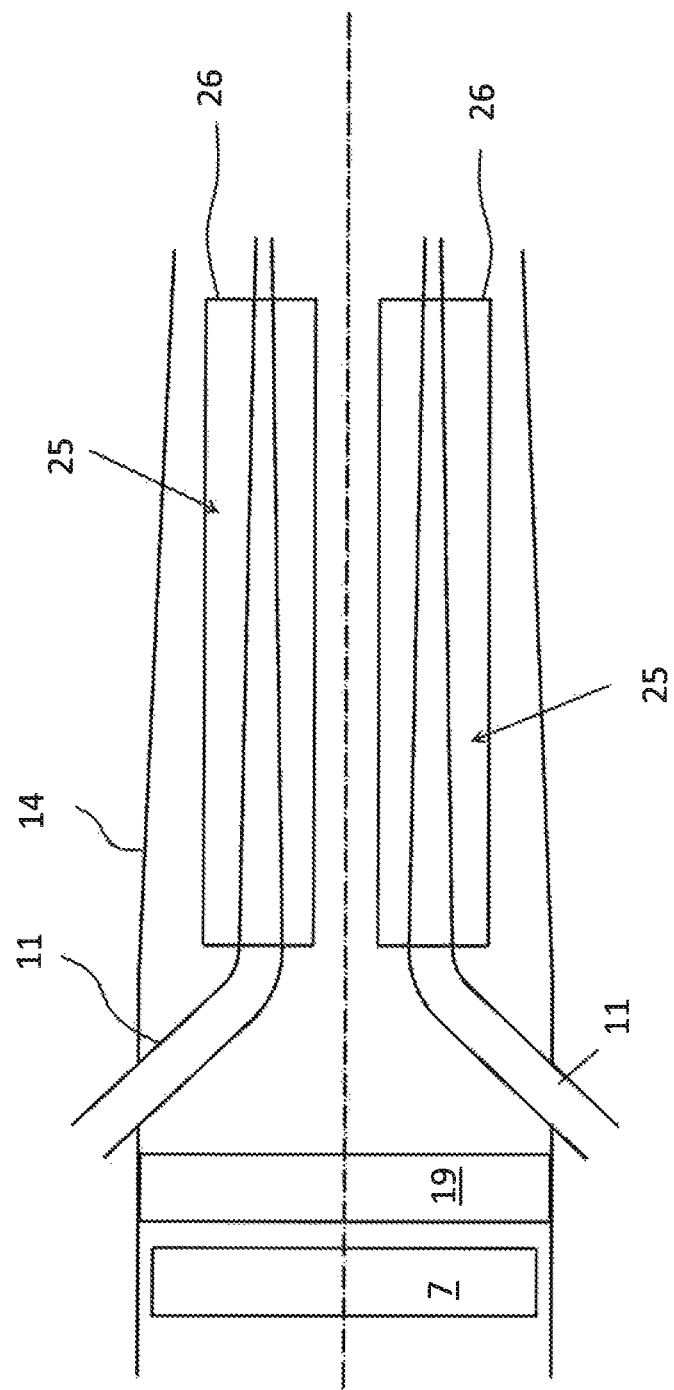
Figure 3:
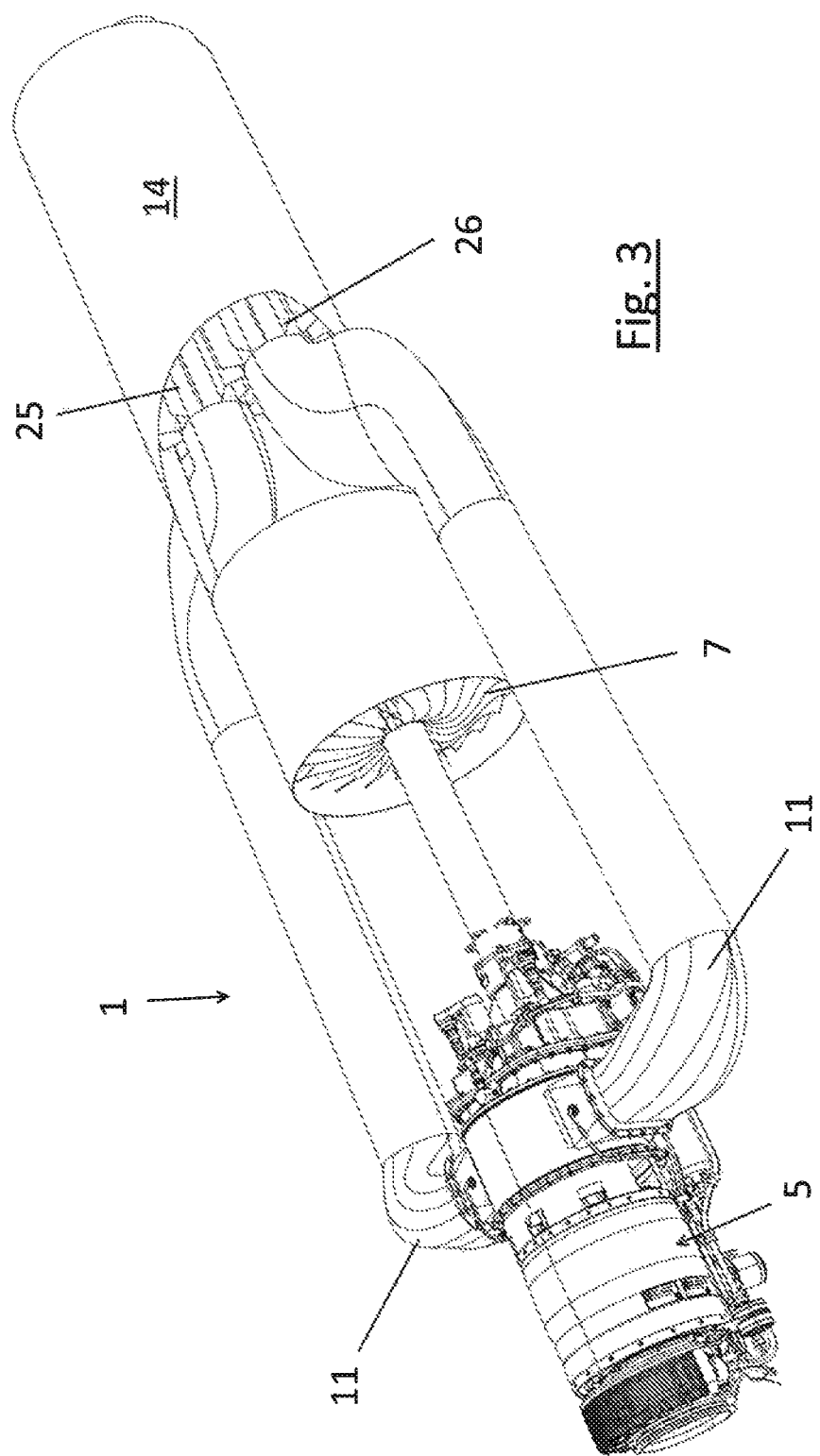
Figure 4:
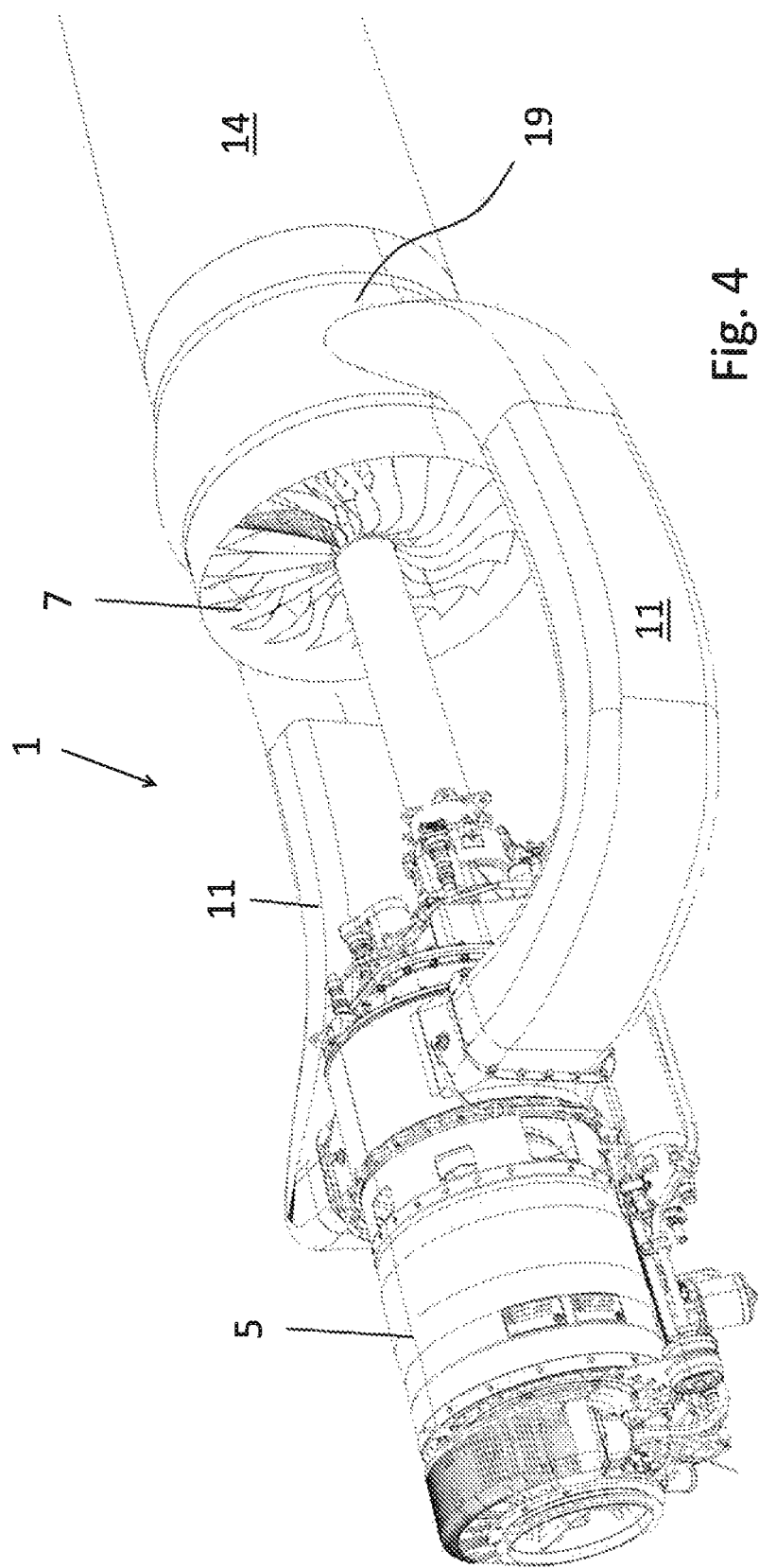
Figure 5:
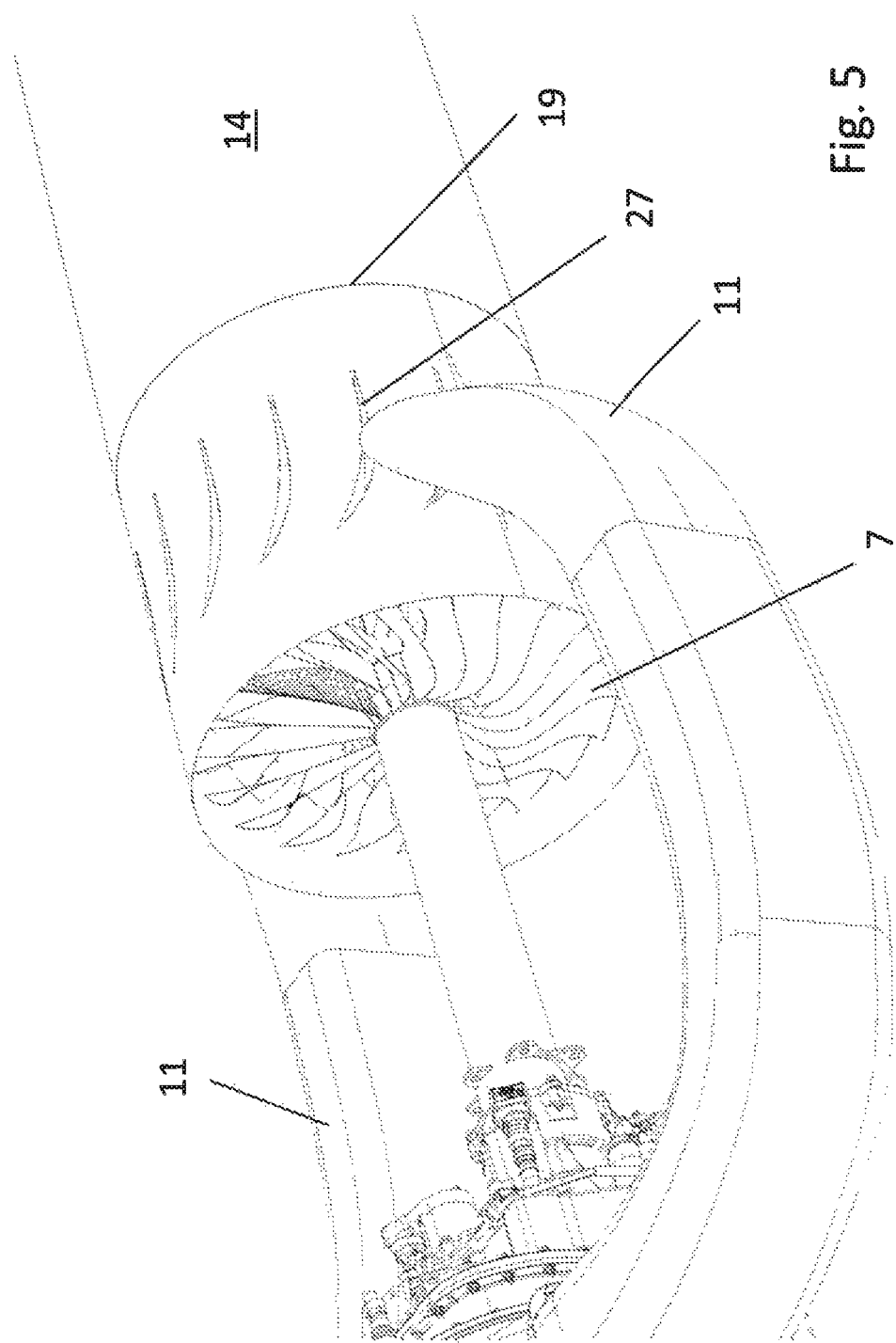

The heat exchanger device 25 includes, according to a first embodiment of the heat exchanger device, heat transfer fins 26 extending in the direction of flight or in the longitudinal direction of the aircraft fuselage. They extend into the exhaust duct system 11 and into the thrust tube 14 (FIGS. 2 and 3).

An area of the heat transfer fins 26 which extends into the exhaust duct system 11 is heated up by the hot exhaust gases flowing in the exhaust duct system 11. This heat energy is then transferred, via an area of the heat transfer fins extending into the thrust tube 14, into the passing thrust jet.

The exhaust gas tubes of the exhaust duct system narrow against the direction of flight 10 in proportion to the cooling down of the exhaust gases. A jacket wall of the thrust tube 14 narrows to the same extent, so that the cross-section of the thrust tube 14 in which the thrust jet is guided is roughly constant. The increase in volume during heating up effects an acceleration of the thrust jet and therefore a thrust gain.

According to a second embodiment of the heat exchanger device 25, the latter is integrated in the stator device 19 (FIGS. 4 to 7). In this case, the heat energy from the exhaust gas flow is introduced into the thrust jet via the stator device 19, leading to the increase in thrust described above.

The guide vanes 24 of the stator device 19 are in the form of hollow moldings which bound channels 27. The exhaust gas flow of the turbine 5 is introduced into the channels 27 formed in the guide vanes 24 via a jacket wall of the stator device 19. The exit of the cooled exhaust gas flow is made via slits formed in the end sections of the guide vanes 24. The flow cross-section within the guide vanes 24 narrows according to the volume reduction of the exhaust gas during cooling.

In this way, the flow retardation of the stator device 19 is offset by the heating up of the thrust jet (i.e. through the enlargement of the flow cross-section in the stator device 19 due to the alignment of the thrust jet in the axial direction, the expansion of the air due to heat may be offset in this area). This increases efficiency and counteracts any stalling at the guide vanes 24.

The guide vanes may also be equipped with concentric heat exchanger plates 26. This makes it possible to transfer more heat energy to the impeller airflow. The guide vanes 24 may also be made considerably longer towards the aircraft rear, in order to provide a greater heat exchanger surface.

LIST OF REFERENCE NUMBERS

1 drive device
2 aircraft
3 cockpit
4 aircraft fuselage
5 shaft turbine
6 shaft
7 impeller
8 housing
9 rotor
10 direction of flight
11 exhaust duct system
12 intake side
13 thrust side
14 thrust tube
15 exhaust outlet
16 turbine air supply device
17 suction intake
18 turbine air supply channel 19 stator device
20 impeller air supply device
21 suction intake
22 impeller air supply channel
23 guide vane ring
24 guide vane
25 heat exchanger device
26 heat exchanger fin
27 channel

The invention claimed is:

1. A drive device for an aircraft with a shaft turbine which is coupled via a shaft to an impeller which has an intake side and a thrust side, wherein the shaft turbine is mounted in the area of the intake side of the impeller, the drive device is designed for mounting on an aircraft fuselage and/or inside an aircraft fuselage and/or in a casing or on a wing;
wherein the exhaust gases of the shaft turbine are guided via exhaust ducts, of which there are at least one exhaust duct around the impeller, in the area of the thrust side of the impeller.

2. The drive device according to claim 1, wherein the energy of the shaft turbine is fed to the impeller via the shaft.

3. The drive device according to claim 1, wherein the exhaust gases of the shaft turbine are so guided away via an exhaust duct system that the exhaust gases are directed into the area of the intake side of the impeller.

4. The drive device according to claim 1, wherein a thrust tube is provided in the area of the thrust side next to the impeller.

5. The drive device according to claim 4, wherein an exhaust duct system comprises two channels which have a roughly circular cross-section and narrow conically against the direction of flight.

6. The drive device according to claim 1, wherein an exhaust duct system comprises two channels which have a roughly circular cross-section and narrow conically against the direction of flight.

7. The drive device according to claim 6, wherein there is provided in the area of a thrust tube a heat exchanger which is so designed that the heat energy contained in the exhaust gas flow is introduced via the heat exchanger into the thrust tube and thus into the thrust jet.

8. The drive device according to claim 1, wherein the exhaust gases of the shaft turbine are guided into the area of the thrust side of the impeller and into a thrust tube.

9. The drive device according to claim 8, wherein there is provided in the area of the thrust tube a heat exchanger which is so designed that the heat energy contained in the exhaust gas flow is introduced via the heat exchanger into the thrust tube and thus into a thrust jet.

10. The drive device according to claim 1, wherein the impeller has a rotor and a housing, wherein the impeller is made of a carbon-fiber composite.

11. The drive device according to claim 10, wherein the rotor is connected directly to the shaft turbine via the shaft.

12. The drive device according to claim 10, wherein the rotor is connected to the shaft turbine via a gear stage and a clutch.

13. A drive device for an aircraft with a shaft turbine which is coupled via a shaft to an impeller which has an intake side and a thrust side, wherein the shaft turbine is mounted in the area of the intake side of the impeller, the drive device is designed for mounting on an aircraft fuselage and/or inside an aircraft fuselage and/or in a casing or on a wing, wherein a thrust tube is provided in the area of the thrust side next to the impeller and there is provided in the area of the thrust tube a heat exchanger which is so designed that the heat energy contained in the exhaust gas flow is introduced via the heat exchanger into the thrust tube and thus into a thrust jet.

14. The drive device according to claim 13, wherein the heat exchanger includes heat exchanger fins extending in the longitudinal direction of the aircraft fuselage, which extend into an exhaust duct system and into the thrust tube.

15. A drive device for an aircraft with a shaft turbine which is coupled via a shaft to an impeller which has an intake side and a thrust side, wherein the shaft turbine is mounted in the area of the intake side of the impeller, the drive device is designed for mounting on an aircraft fuselage and/or inside an aircraft fuselage and/or in a casing or on a wing, wherein there is mounted in the area against the direction of flight behind the impeller and in the area of the thrust tube a stator device which has a fixed guide vane ring which deflects the airflow axially to the direction of flight.

16. The drive device according to claim 15, wherein a heat exchanger is so integrated in the stator device that the heat energy from the exhaust gas flow may be introduced via the stator device into a thrust jet.

17. The drive device according to claim 16, wherein guide vanes of the guide vane rinq of the stator device are in the form of hollow moldings, so designed that the exhaust gas flow of the shaft turbine is brought into the guide vanes over a jacket wall of the stator device and the exit of the cooled exhaust gas flow is effected via slits made in the end sections of the guide vanes.

18. An aircraft comprising
a fuselage and wings, together with a drive device with a shaft turbine which is coupled via a shaft to an impeller which has an intake side and a thrust side, wherein the shaft turbine is mounted in the area of the intake side of the impeller, and the drive device is designed for mounting on and/or inside the fuselage and/or in a casing or on the wings;
wherein the exhaust gases of the shaft turbine are guided via exhaust ducts, of which there are at least one exhaust duct around the impeller, in the area of the thrust side of the impeller.

19. The aircraft according to claim 18, wherein an impeller air supply device is provided, which guides air from outside the aircraft into the area between the shaft turbine and the intake side of the impeller.

20. The aircraft according to claim 18, wherein a turbine air supply device is provided, which guides air from outside the aircraft and/or from the thrust jet to an intake side of the shaft turbine.

21. The aircraft according to claim 20, wherein
an air supply device is provided, which guides air from outside the aircraft into the area between the shaft turbine and the intake side of the impeller.

22. The aircraft according to claim 18, wherein
the drive device is provided in the fuselage in an area behind a cockpit and/or in each case at least one drive device is provided in the wings or in a housing on the wings and/or outside on the fuselage.

* * * * *